(12) United States Patent
Hunziker et al.

(10) Patent No.: US 10,072,505 B2
(45) Date of Patent: Sep. 11, 2018

(54) TURBINE AIRFOIL OF COMPOSITE MATERIAL AND METHOD OF MANUFACTURING THEREOF

(75) Inventors: Rolf Hunziker, Dintikon (CH); Said Havakechian, Baden (CH)

(73) Assignee: General Electric Technology GmbH, Baden (CH)

( * ) Notice: Subject to any disclaimer, the term of this patent is extended or adjusted under 35 U.S.C. 154(b) by 1758 days.

(21) Appl. No.: 13/525,149

(22) Filed: Jun. 15, 2012

(65) Prior Publication Data

US 2012/0328446 A1    Dec. 27, 2012

(30) Foreign Application Priority Data

Jun. 21, 2011   (CH) ........................................ 1043/11

(51) Int. Cl.
*F01D 5/28* (2006.01)
*F01D 5/14* (2006.01)

(52) U.S. Cl.
CPC ............. *F01D 5/282* (2013.01); *F01D 5/147* (2013.01); *F01D 5/286* (2013.01); *F01D 5/288* (2013.01); *F05D 2230/23* (2013.01); *F05D 2230/60* (2013.01); *F05D 2230/90* (2013.01); *F05D 2240/301* (2013.01); *F05D 2260/95* (2013.01); *Y02T 50/672* (2013.01); *Y02T 50/673* (2013.01); *Y10T 29/49337* (2015.01)

(58) Field of Classification Search
CPC .......... F01D 5/286; F01D 5/288; F01D 5/282; F05D 2230/90; F05D 2260/95
USPC ....................................................... 416/224
See application file for complete search history.

(56) References Cited

U.S. PATENT DOCUMENTS

| | | | | |
|---|---|---|---|---|
| 3,762,835 A | * | 10/1973 | Carlson et al. | ............... 416/224 |
| 4,006,999 A | | 2/1977 | Brantley et al. | |
| 4,111,606 A | * | 9/1978 | Prewo | ........................... 416/224 |
| 5,141,400 A | | 8/1992 | Murphy et al. | |
| 5,375,978 A | * | 12/1994 | Evans et al. | ................... 416/230 |
| 5,655,883 A | | 8/1997 | Schilling | |

(Continued)

FOREIGN PATENT DOCUMENTS

| | | |
|---|---|---|
| CN | 2851583 Y | 12/2006 |
| CN | 101089369 A | 12/2007 |

(Continued)

OTHER PUBLICATIONS

Office Action (Notification of Reasons for Refusal) dated Jul. 22, 2014, by the Japanese Patent Office in corresponding Japanese Patent Application No. 2012-138303 and an English translation of the Office Action. (13 pages).

(Continued)

*Primary Examiner* — Eldon Brockman
(74) *Attorney, Agent, or Firm* — Cynthia W. Flanigan

(57) ABSTRACT

A turbine blade having a root and a tip and an airfoil with a core section made of composite material and a protective sheath or layer joined to the composite core at a location or locations exposed to erosion is described with the composite core of the airfoil being continuous from a location in vicinity of the root to a location in vicinity of the tip of the blade and including a section which widens with distance from the rotational axis along the length of the airfoil and which ends at the location in vicinity of the tip of the blade. The protective sheath or layer is secured by interference fit with widening section of the core.

8 Claims, 4 Drawing Sheets

(56) References Cited

U.S. PATENT DOCUMENTS

| | | | |
|---|---|---|---|
| 5,785,498 A | | 7/1998 | Quinn et al. |
| 5,908,285 A | * | 6/1999 | Graff .................... 416/224 |
| 6,071,077 A | * | 6/2000 | Rowlands ............. 416/223 A |
| 6,139,278 A | | 10/2000 | Mowbray et al. |
| 6,413,051 B1 | | 7/2002 | Chou et al. |
| 6,843,928 B2 | | 1/2005 | Cline et al. |
| 7,156,622 B2 | * | 1/2007 | Schreiber ............. B23P 15/04 416/224 |
| 7,393,183 B2 | * | 7/2008 | Keller .................... 416/224 |
| 7,429,165 B2 | | 9/2008 | Burdgick et al. |
| 7,588,421 B2 | | 9/2009 | Burdgick et al. |
| 7,640,661 B2 | | 1/2010 | Despreaux et al. |
| 7,828,526 B2 | | 11/2010 | Cairo et al. |
| 8,221,065 B2 | * | 7/2012 | Greim et al. ............ 415/192 |
| 8,777,577 B2 | | 7/2014 | Schreiber |
| 2003/0071019 A1 | | 4/2003 | Cline et al. |
| 2005/0278950 A1 | | 12/2005 | Despreaux et al. |
| 2006/0275626 A1 | | 12/2006 | Bernard et al. |
| 2007/0041841 A1 | | 2/2007 | Walter et al. |
| 2007/0231154 A1 | | 10/2007 | Burdgick et al. |
| 2007/0231155 A1 | | 10/2007 | Burdgick et al. |
| 2007/0292274 A1 | | 12/2007 | Burdgick et al. |
| 2008/0152506 A1 | * | 6/2008 | Schreiber ............. F01D 5/282 416/229 R |
| 2008/0152858 A1 | | 6/2008 | Schreiber |
| 2008/0159868 A1 | * | 7/2008 | Kray .................... B23P 15/04 416/223 R |
| 2008/0253887 A1 | | 10/2008 | Cairo et al. |
| 2009/0074586 A1 | | 3/2009 | Le Hong et al. |
| 2010/0014982 A1 | | 1/2010 | Haje |
| 2011/0194941 A1 | * | 8/2011 | Parkin .................. B29C 70/48 416/224 |
| 2011/0299994 A1 | | 12/2011 | Behnisch et al. |

FOREIGN PATENT DOCUMENTS

| | | |
|---|---|---|
| DE | 536278 C | 10/1931 |
| DE | 10 2006 061 915 A1 | 7/2008 |
| EP | 2037082 A1 | 3/2009 |
| JP | 62-165511 A | 7/1987 |
| JP | 62-171976 A | 7/1987 |
| JP | 62-174377 A | 7/1987 |
| JP | 4-330301 A | 11/1992 |
| JP | 8-210102 A | 8/1996 |
| JP | 9-217602 A | 8/1997 |
| JP | 10-176231 A | 6/1998 |
| JP | 2003-278502 A | 10/2003 |
| JP | 2005-256838 A | 9/2005 |
| JP | 2007-270839 A | 10/2007 |
| JP | 2008-069782 A | 3/2008 |
| JP | 2008-261334 A | 10/2008 |
| JP | 2009-516798 A | 4/2009 |
| JP | 2012-516405 A | 7/2012 |
| WO | 2010066648 A1 | 6/2010 |
| WO | 2010/086268 A2 | 8/2010 |
| WO | 2011039075 A1 | 4/2011 |

OTHER PUBLICATIONS

Office Action/Search Report dated Jul. 25, 2014, by the Chinese Patent Office in corresponding Chinese Patent Application No. 201210207156.8 and an English translation of the Office Action/Search Report. (16 pages).

Office Action dated Dec. 9, 2015, by the German Patent Office in corresponding German Patent application No. 10 2012 011 952.6. (7 pages).

* cited by examiner

TURBINE AIRFOIL OF COMPOSITE MATERIAL AND METHOD OF MANUFACTURING THEREOF

RELATED APPLICATION

The present application hereby claims priority under 35 U.S.C. Section 119 to Swiss Patent application number 01043/11, filed Jun. 21, 2011, the entire contents of which are hereby incorporated by reference.

FIELD OF THE INVENTION

The present invention relates to turbine airfoils of composite material, particularly for steam turbines, and methods of manufacturing such airfoils.

BACKGROUND

In the following description the term "turbine" is used to refer to rotary engines having a rotating part and a stator part force coupled by a fluid medium such as water, steam or gas. Of particular interest for the present invention are axial turbines comprising radially arranged fixed stator blades or vanes alternating with radially arrangements of moving rotor blades. Movements are generally defined as movements relative to a casing or housing.

In large turbines, particularly steam turbines, the moving blades or airfoils are presently manufactured using steel or titanium based alloys. In a multi-stage turbine, the size of the blades increases from stage to stage. In the final stage of the largest low pressure turbines the height of a turbine blade can exceed one meter or more. While it is desirable to increase the size of the turbine stages and thereby increase its flow-off surface and efficiency, the properties of current materials have reached theirs limits mainly because of the large centrifugal forces acting on the rotating blades.

To overcome the barriers set by the materials properties of steel and titanium, composite material airfoils have been proposed using mainly carbon fiber based materials. Though a large number of such designs have been published, real-world applications of such composite blades are currently limited to gas turbines for advanced aircrafts engines.

One of the reasons which so far prevented large-scale adoption of composite blades in the field of electrical power generation is the lack of resistance of the composite materials to erosion. Specifically in the field of steam turbine blades, the material is subject to erosion by water droplet condensing from the steam passing through the turbine over a long period of operation. Under the constant bombardment of the condensate from the water steam, composite material erodes much faster than the currently applied metal alloys and is thus not suitable as airfoil material for large steam turbine blades.

As known solution to the general problem of erosion, the use of protective layers has been suggested since the early thirties in a number of published patent documents such as the German patent DE 536278 C2. For composite blades, protective layers are described for example in published United States patent application US 2008/0152506 A1 and published international patent applications WO 2011/039075 A1 and WO 2010/066648.

Whilst the solution of applying a protective layer or coating may have the potential of reducing erosion at the exposed parts of the turbine blade, further improvements are required to render composite airfoils operational. In particular, it is seen as an object of the present invention to improve the way the protective layer and the composite core of a turbine airfoil are joined.

SUMMARY

The present disclosure is directed to a turbine blade having a root, a tip, an airfoil with a core section made of composite material and a protective sheath joined to the composite core at least in an area of the airfoil exposed to erosion. The composite core of the airfoil is continuous from a location in vicinity of the root to a location in a vicinity of the tip of the blade and includes a section which widens from the rotational axis along the length of the airfoil and which ends at the location in the vicinity of the tip of the blade.

The present disclosure is also directed to a method of manufacturing a blade for a steam turbine. The method includes providing a core continuously extending from a location in the vicinity of a root section of the blade to a location in the vicinity of a tip section of the blade and surrounding the core of composite material with a protective sheath of a different material. The method also includes increasing the width of the core of composite material at least at the vicinity of the tip end of the blade.

BRIEF DESCRIPTION OF THE DRAWINGS

Exemplary embodiments of the invention will now be described, with reference to the accompanying drawings, in which.

Figure 1A:
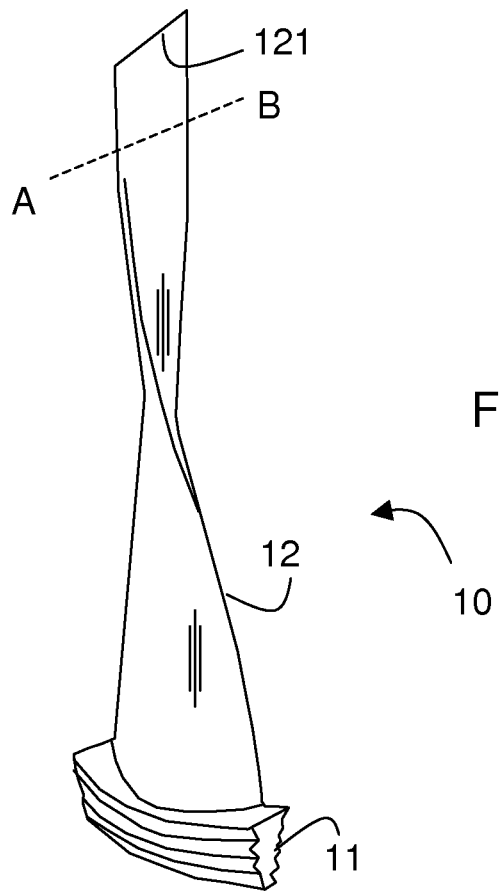
FIGS. 1A and 1B show a three-dimensional view and a horizontal cross-section of a conventional last-stage blade for a steam turbine.

DETAILED DESCRIPTION OF THE PREFERRED EMBODIMENTS INTRODUCTION TO THE EMBODIMENTS

According to an aspect of the present invention, there is provided an airfoil of a turbine blade, preferably the rotating blade, with a root and a tip portion with the airfoil having a continuous core made of composite material and being continuous from the root portion to the tip portion and a protective sheath joined to the composite core at a location or locations exposed to erosion, wherein the core widens at least in proximity of the tip portion.

According to a preferred embodiment of this aspect of the invention a movement of the protective sheath along the core in radially-outward direction is prevented by an interference fit between the widening core and the protective sheath.

When referring to a radial direction, such direction is defined as the radial direction from the rotational axis of the turbine rotor.

In a preferred embodiment of this aspect of the invention, the interference fit is achieved by a continuous or step-wide widening of the composite core with distance from the rotational axis. This widening can result in an increased length of the circumference of cross-sections of the airfoil taken perpendicular to the radial direction or, more specifically to turbine blades, in an increase of the airfoil's chord length or profile thickness in direction towards its tip. In a variant of this embodiment, the chord length, as a function of the radial distance, has at least one section in proximity to the tip where the chord length increases as a function of the radial distance, and may have a first section where the chord length decreases as a function of the radial distance followed by the section where the chord length increases as a function of the radial distance when looking along the blade from its root to the tip.

The airfoil is understood herein as the aerodynamically-formed part of the blade that causes the desired reaction force on the rotor when in motion relative to the surrounding medium. The term excludes the so-called root part of the blade, which is used to anchor the blade in the rotor, and any shroud part, which in some of the known blade designs are used to interlock with the shroud part of the neighboring blades to form a sealing or stabilizing circumferential ring around the assembled blades. The main orientation of the shroud is thus in circumferential direction, whereas the airfoil and any specific tip extensions of the airfoil, such as winglets, are oriented towards the flow direction of the medium. Other stabilizing parts, such as snubbers, are also not included in the term "airfoil" as used herein.

The shape of the new airfoil is typically a complex three-dimensional shape, which widens towards the tip in what could be described as an inverted cone section. The inverted cone shape provides an interference fit preventing any relative motion in the radial direction between the protective sheath and the composite core, thus reinforcing any additional fixing between the two. But it is important to note that the inverted cone shape of the blade can have advantages beyond the improvement to the stability of the joint between the protective sheath and the composite core.

In a preferred variant of this aspect of the invention the widening section of the core ends at the tip or very close to the tip of the airfoil. However, the location of its starting point along the length of the blade is very much subject to design consideration such as stability, weight and desired flow-off area.

In another preferred embodiment of this aspect of the invention the protective sheath is joined with the composite core through a bonding or adhesive layer such as a glue foil. The new design of the blade in accordance with the invention acts to support and, in case of its failure, replaces the foil to prevent a rupture or loosening of the protective sheath.

In a further preferred embodiment the protective sheath is a metal layer. The layer is advantageously assembled from several parts, for example a thick part designed to cover the leading edge of the blade and any adjacent areas of high erosion, a second part designed to cover the trailing edge of the airfoil and two thin sheet-like parts to cover the remaining exposed areas on the pressure and suction side of the airfoil.

The manufacturing of a composite airfoil or blade in accordance with the present invention can generally follow the known manufacturing steps for composite blades. These methods include for example the use of strands or woven pieces of the composite fiber material. In a preferred embodiment of this aspect of the invention, additional fiber material is added at the tip of the airfoil to the strands or woven mats, which make up the main part of fiber material for the continuous core. After adding fiber material at the tip, the core material is impregnated with the matrix material as in conventional designs.

These and further aspects of the invention will be apparent from the following detailed description and drawings as listed below.

DETAILED DESCRIPTION

Aspects and details of examples of the present invention are described in further details in the following description using the example of a last stage rotor blade for a steam turbine.

Shown in FIG. 1A is a schematic drawing of a last stage rotor blade 10 for a steam turbine. The metal blade includes an airfoil 12 attached to a root section 11. The root section 11 is typically slotted into matching grooves within the rotor (not shown). In a turbine, a plurality of such metal blades 10, typically 50 to 60 for a last stage, are arranged around the rotor to form the rotor part of the stage. At its distal end or tip 121 the blade rotates in close proximity to the stator or stator casing (not shown). As in other parts of this specification, reference to a rotational movement is meant to designate the rotation of the rotor of the turbine within the stator unless specified otherwise.

Figure 1B:
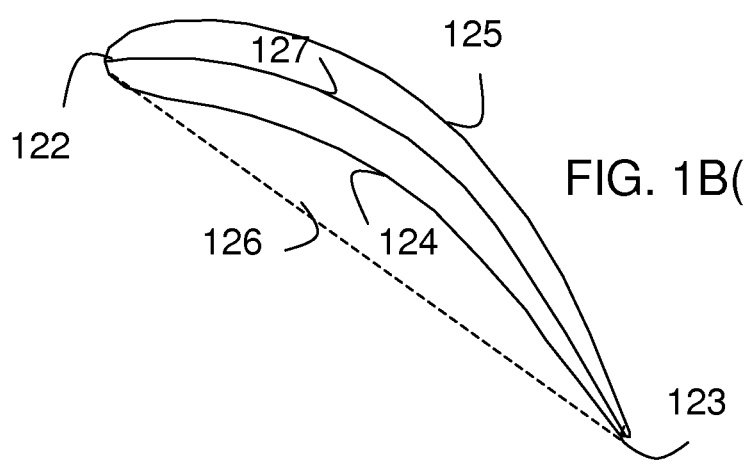

A horizontal, i.e. perpendicular to the radial direction, cross-section along the arbitrarily chosen line A-B of the airfoil 12 is shown in FIG. 1B. The cross-section illustrates the leading edge 122 and the trailing edge 123 of the airfoil 12. Also shown are what is typically referred to as the pressure side 124 and the suction side 125 of the airfoil 12. An imaginary line 126 connecting the leading edge 122 with the trailing edge 123 is defined as the "chord" of the airfoil 12.

In generally, the chord can be regarded as one of the possible measures determining the width of the airfoil. Other such possible measures are the circumference of a horizontal cross-section of the blade or its area, the profile thickness, or the length of the middle or camber line 127. It is possible to refer to the increase of any one of such measures as an increase in width or widening of the airfoil. However, to increase the length of chord or any equivalent thereof towards the tip of the blade is seen as the most effective way of implementing the present invention.

Figure 2A:
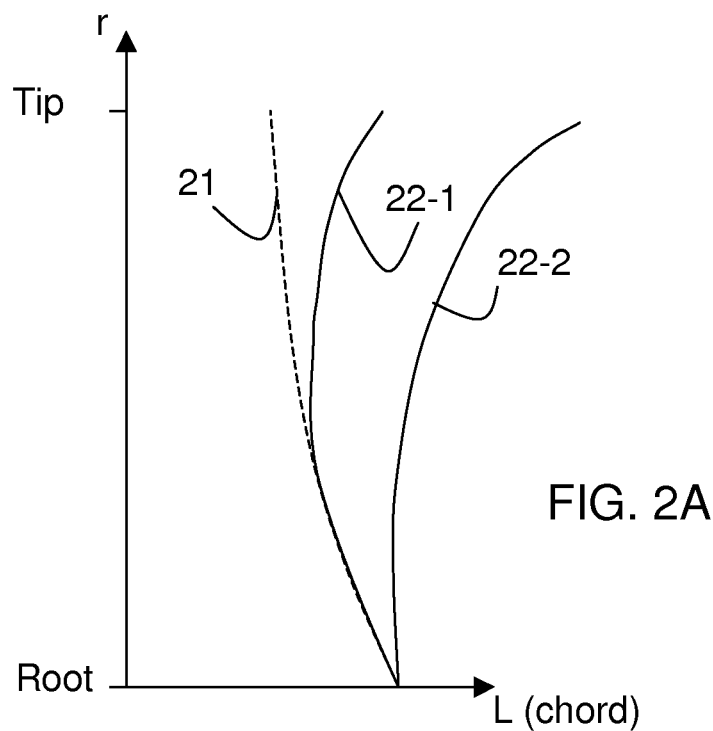
FIGS. 2A and 2B illustrate schematically changes in the chord length of a blade in accordance with an example of the invention.
Figure 2B:
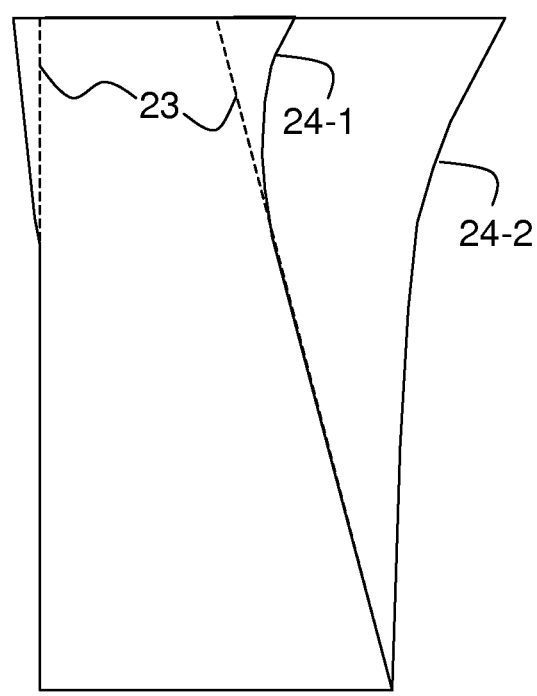

The widening by means of increasing the chord length is illustrated in FIGS. 2A and 2B. In FIG. 2A the chord length L is shown in relation to the radial distance r to the rotor axis of the cross-section at which the chord length L is measured for a known shape of an airfoil and for an airfoil in accordance with an example of the present invention. The former known airfoil shape is represented by the dashed curve 21 and the new blade design is represented by the solid curve 22.

Though the true shape of a modern airfoil is a complex three-dimensional shape, the chord length of most modern last stage steam turbine airfoils follows the profile 21. This profile 21 indicates a continuously decreasing chord length as is characteristic of a general conical shape. For the new profile 22-1 however the chord length L increases—in the example shown continuously—toward the tip of the blade. The increase or widening can also start close to the root of the blade. Such an alternative example of the invention is represented by the curve 22-2.

With the widening airfoil design in accordance with the present invention it is possible to reduce the number of blades in the last stage to below 40, and potentially below 35, even for the largest steam turbines.

Another way of visualizing examples of the present invention is chosen in FIG. 2B: The dashed shape 23 represents a two-dimensional projection of a conventional airfoil onto the paper plane and the solid shape 24-1 represents a two-dimensional projection of an airfoil in accordance with an example of the invention onto the paper plane. Again the root is located at the bottom and the tip at the top of the shape. The solid shape 24-2 represents a two-dimensional projection of an airfoil where the widening begins already at a location close to the root.

Though the two-dimensional projection into the paper plane of FIG. 2B flattens visually the three-dimensional shape of both types of blades, it clearly shows the widening of the new airfoils.

Any protective sheath which is wrapped around the core of the new airfoil near the tip is forced into interference fit by the widening of the core at the tip. This interference fit is particularly important in cases where the protective sheath is joined with the core by a bonding or adhesive layer. In operation, such blades are exposed to high temperatures and centrifugal forces and, if the bond fails, the protective sheath could fly off the blade and damage other parts of the turbine.

The interference fit prevents the loosening of the protective sheath unless it disintegrates completely. The design counteracts the forces created by the fast rotation of the blade in operation.

Figure 3A:
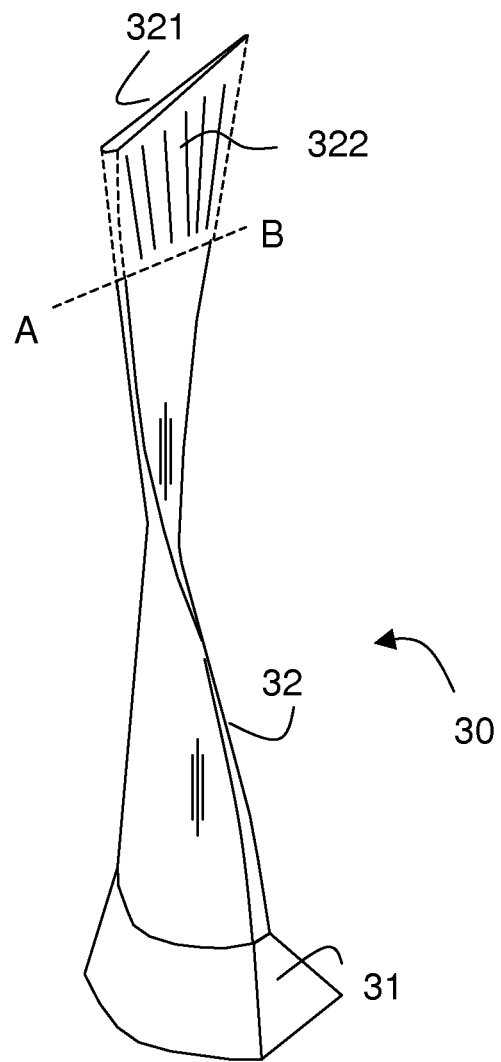
FIGS. 3A and 3B show a three-dimensional view and a horizontal cross-section of a last-stage blade for a steam turbine blade in accordance with an example of the invention.

Steps of manufacturing a composite blade in accordance with an example of the present invention are described in the following making reference to FIG. 3A showing a perspective view of a composite blade and FIG. 3B, which shows a horizontal cross-section of a composite blade similar to FIG. 1A.

A composite airfoil or blade in accordance with an example of the present invention can for example be prepared using the vacuum infusion process known per se. In such a process a woven mesh of fibers is spread in a die, which approximates the shape of the airfoil to be manufactured. Additional fiber material is added at the tip of the airfoil to the strands or woven mats. After adding fiber material at the tip, the fiber material is impregnated under vacuum conditions in the die with the matrix material such as resin.

Other known manufacturing methods such as hand laminating can be used. Variants such as prepreg or wet layup can also be applied. An overview of known method to produce a core of composite material is published for example in the international patent application WO 2011/039075. However for the purpose of the present invention and the sake of clarity, no further details of these standard methods are reiterated herein.

Once the composite core is prepared and metal sheets which make up the protective layer are formed and cut or machined, both are joined in a combined process involving steps of welding and gluing as described below when making reference to FIGS. 3A and 3B.

In FIG. 3A a perspective view is shown of a composite blade in accordance with an example of the invention. The blade 30 includes the airfoil section 32 and a root part 31. The root part 31 is pyramid-shaped. The tip 321 of the airfoil section 32 of the blade 30 is widened by the presence of additional fiber material 322 in the core.

Figure 3B:
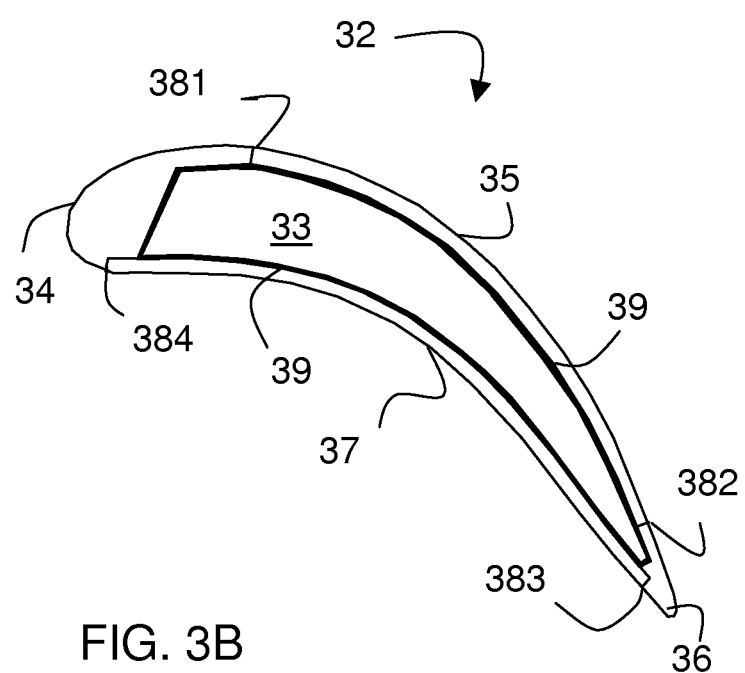

A cross-section of the blade 30 along line A-B is shown in FIG. 3B. It illustrates schematically the structure of the airfoil 32 including the core 33 of resin-based material reinforced with carbon fibers. The core 33 is completely wrapped in a protective sheath made of an erosion resistant material such as titanium or steel alloy. For ease of manufacturing the protective sheath is assembled from at separate parts. In the example shown, these parts include a leading edge cover 34, a covering sheet 35 for the suction side, a trailing edge cover 36 and a covering sheet 37 for the pressure side.

The airfoil 32 is assembled by joining first the edge cover 34, the covering sheet 35 for the suction side and the trailing edge cover 36 at the two welding seams 381, 382. The core material 33 surrounded by an adhesive layer 39 is then placed into the recess formed by the welded parts and the covering sheet 37 for the pressure side is placed on top to completely enclose the core. The covering sheet 37 for the pressure side is joined at the welding seams 383, 384. These latter welding seams 383, 384 are located at the edges of recesses machined into the leading edge cover 34 and the trailing edge cover 36, respectively, to avoid thermal damage to the adhesive layer and the core during the welding process.

The present invention has been described above purely by way of example, and modifications can be made within the scope of the invention. For example the sheath which surrounds the core can be replaced by a partial cover which while limited to sections of the core particularly exposed to erosion is shaped to maintain interference fit as described.

The invention also consists in any individual features described or implicit herein or shown or implicit in the drawings or any combination of any such features or any generalization of any such features or combination, which extends to equivalents thereof. Thus, the breadth and scope of the present invention should not be limited by any of the above-described exemplary embodiments. Each feature disclosed in the specification, including the drawings, may be replaced by alternative features serving the same, equivalent or similar purposes, unless expressly stated otherwise.

Unless explicitly stated herein, any discussion of the prior art throughout the specification is not an admission that such prior art is widely known or forms part of the common general knowledge in the field.

LIST OF REFERENCE SIGNS AND NUMERALS last stage rotor blade 10, 30
root section 11, 31
airfoil 12, 32
tip 121, 321
leading edge 122
trailing edge 123
pressure side 124
suction side 125
chord 126
camber line 127
chord length L in relation to the radial distance r 21, 22-1, 22-2
two-dimensional projection of an airfoil 23, 24-1, 24-2
core 33
leading edge cover 34
covering sheet for the suction side 35,
trailing edge cover 36
covering sheet for the pressure side 37
welding seams 381, 382, 383, 384
adhesive layer 39

What is claimed is:

1. A turbine blade, comprising:
   a root;
   a tip;
   an airfoil extending therebetween with a core section made of composite material;
   a protective sheath including a leading edge cover, a suction side cover, a trailing edge cover and a pressure side cover, the leading edge cover and the trailing edge cover each having recesses;

an adhesive layer between the protective sheath and the core section;

wherein the protective sheath is joined to the core section at least in an area of the airfoil exposed to erosion, the core section of the airfoil is continuous from a location in a vicinity of the root to a location in a vicinity of the tip of the blade and comprises a section which widens from the rotational axis along the length of the airfoil and which ends at the location in the vicinity of the tip of the blade;

welding seams arranged in the respective recesses of the leading edge cover and the trailing edge cover and offset from the adhesive layer for avoiding thermal damage to the adhesive layer during a welding process; and an interference fit provided for the protective sheath by the widening section of the core section configured for preventing movement of the protective sheath along the core section in a radially outward direction.

2. The turbine blade of claim 1 wherein the widening is continuous or step-wise.

3. The turbine blade of claim 1 wherein the widening includes a lengthening of the airfoil's chord length towards the tip.

4. The turbine blade of claim 3 wherein the airfoil has a section where the chord length decreases as a function of the radial distance followed by a section where the chord length increases as a function of the radial distance.

5. The turbine blade of claim 3 wherein chord length increases continuously as a function of the radial distance from the location in vicinity of the root to the location in vicinity of the tip of the blade.

6. The turbine blade of claim 1 being a blade for a steam turbine.

7. The turbine blade of claim 1 being a last stage blade for a steam turbine.

8. A method of manufacturing a blade for a steam turbine comprising:

providing a core of composite material continuously extending from a location in a vicinity of a root section of the blade to a location in a vicinity of a tip section of the blade;

surrounding the core with a protective sheath of a different material, the protective sheath including a leading edge cover, a suction side cover, a trailing edge cover and a pressure side cover, the leading edge cover and the trailing edge cover each having recesses;

increasing the width of the core of composite material at least at the vicinity of the tip end of the blade;

providing an adhesive layer between the protective sheath and the core;

providing welding seams in the respective recesses of the leading edge cover and the trailing edge cover offset from the adhesive layer for avoiding thermal damage to the adhesive layer during a welding process; and providing an interference fit for the protective sheath by the widening section of the composite core configured for preventing movement of the protective sheath along the core in a radially outward direction.

* * * * *